Sept. 13, 1960  K. FOWLER ET AL  2,952,390
LEAK DETECTING SYSTEM
Filed Oct. 8, 1958  2 Sheets-Sheet 1

Inventor
Kirk Fowler
Marvin A. Brown
Elmer M. Deters
By McCanna, Morsbach & Pillote
Atty's

United States Patent Office 2,952,390
Patented Sept. 13, 1960

2,952,390

LEAK DETECTING SYSTEM

Kirk Fowler, Marvin A. Brown, and Elmer M. Deters, Davenport, Iowa, assignors to Red Jacket Manufacturing Co., Davenport, Iowa, a corporation of Iowa Filed Oct. 8, 1958, Ser. No. 765,980

12 Claims. (Cl. 222—63)

This invention relates to a leak detecting system and particularly to a system for detecting leaks in a supply line through which fluid is intermittently delivered.

In the dispensing of gasoline at service stations, it has heretofore been the general practice to locate a pump at each pedestal and to draw the gasoline by suction from the underground tank. With this arrangement, there is no safety problem due to leakage of gasoline from the supply line since the pressure in the supply line between the tank and the pedestal was below the surrounding atmospheric pressure and any leakage would be into the system and not out of the same. However, such systems were not entirely satisfactory particularly in the handling of the more highly volatile gasolines which have recently come into use.

It has recently been proposed to locate the pump at the tank for delivering gasoline from the tank to one or more remote pedestals. The gas in the supply line leading from the tank to the pedestal is therefore maintained under pressure so that the more volatile components of the gasoline do not tend to vaporize. However, if there is a leak in the supply line of such a system, the liquid will flow from the supply line into the relatively lower pressure area around the line. When handling explosive and inflammable materials such as gasoline, the accumulations from even a relatively small leak will, over a period of time, produce a very hazardous condition. In those service station installations wherein the pump is located at the tank and the supply line is maintained under pressure, it is therefore necessary to detect even relatively small leaks from the supply line.

The detection of leaks from the supply line is complicated by the fact that the gasoline is only intermittently pumped through the line and the pressure in the line under normal operating conditions and in the absence of any leak will fluctuate widely from full pump discharge pressure down to zero pressure and sometimes even to below atmospheric pressure. Thus, when the pump is started and the discharge valve at the remote pedestal closed, the pressure in the line will build up to substantially full pump discharge pressure. When one or more discharge valves on the associated dispensing pedestals are opened, the pressure will drop somewhat in the line dependent upon the rate of flow from the line. When the pump is stopped, the pressure in the line will also vary dependent upon thermal expansion and contraction of the gasoline therein with changes in ambient temperature.

An important object of this invention is to provide a leak detecting system for accurately and reliably detecting leaks in a supply line through which liquid is intermittently pumped.

Another object of this invention is to provide a system for detecting leaks in a line through which liquid is intermittently pumped, and which system will not give a false indication of a leak when the volume and pressure conditions in the line change due to thermal expansion and contraction of the liquid with changes in ambient temperature.

Another object of this invention is to provide a leak detecting system in accordance with the foregoing objects and which is operative to prevent delivery of liquid through the line when a leak is detected.

A more particular object of this invention is to provide a system for detecting a leak in a liquid line through which liquid is intermittently pumped, which system includes a valve arrangement for automatically trapping liquid in the section of the line under test when the pump is idle and for detecting when the rate of change of the volume-pressure conditions in that section of the line exceeds a preselected rate indicative of a leak as contrasted to thermal contraction of the liquid.

These, together with various ancillary objects and advantages of this invention will be more readily appreciated as the same becomes better understood by reference to the following detailed description when taken in connection with the accompanying drawings wherein.

Figure 1:
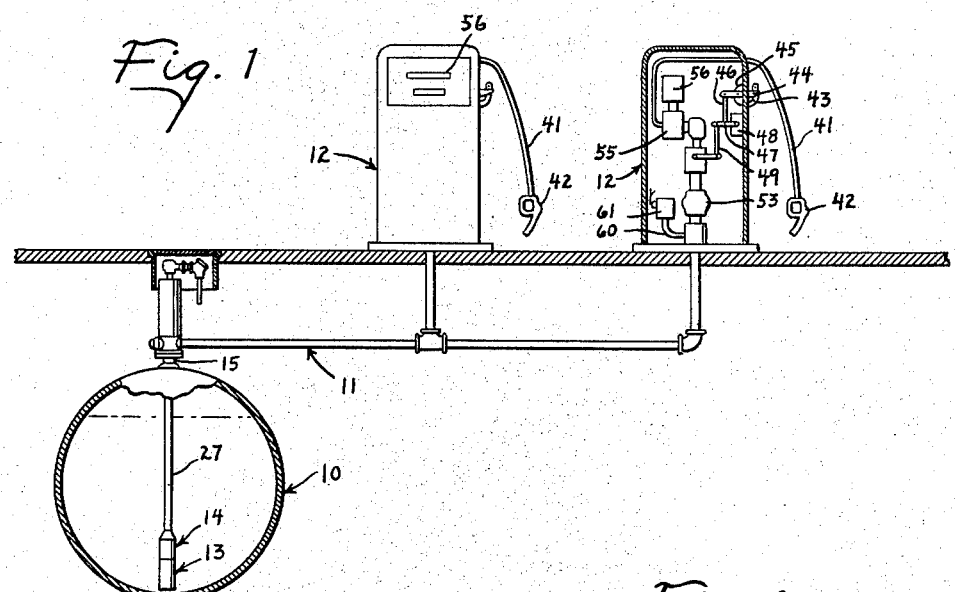
Figure 1 is a diagrammatic view of a service station installation having the leak detecting system of the present invention applied thereto.
Figure 2:
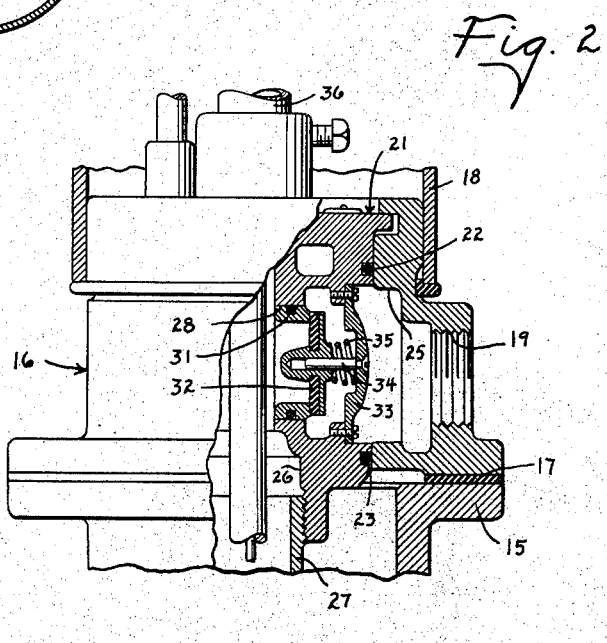
Fig. 2 is an enlarged view of the discharge unit with parts broken away and shown in section to illustrate details of construction.

As previously described, the present invention is adapted for detecting leaks in a supply line through which liquid is intermittently pumped and is herein shown applied to a gasoline serivce station installation. Such an installation is diagrammatically shown in Figure 1 and includes an underground tank 10 for storing a quantity of gasoline and a supply line 11 for delivering gasoline from the tank to one or more pedestals 12. A pump and motor 13, 14, herein shown of the submersible type, is provided in the tank for pumping gasoline from the tank through the supply line 11 to the pedestals. The outlet of the pump may be connected to the supply line in any desired manner. One suitable arrangement is illustrated and includes a flanged fitting 15 on the upper end of the tank, a discharge head 16 mounted on the fitting and sealed thereto by a gasket 17, and an extension 18 attached to the discharge head and extending upwardly therefrom. The discharge head 16 has a lateral outlet 19 connected to the supply line 11. An adapter unit or thimble 21 is disposed in the discharge head and sealed thereto at spaced points by O-rings 22 and 23 to define an annular chamber 25 in the discharge head. The thimble has a downwardly faced opening 26 which is connected to the delivery pipe 27 leading from the pump 13, and a lateral passage 28 is formed in the adapter unit to permit liquid to flow from the downwardly facing opening to the annular chamber 25 in the discharge head. A check valve is provided to prevent return flow of liquid from the supply line and includes a member 31 defining an annular valve seat and a valve member 32 cooperable with the seat. The valve member 32 is mounted by a spider 33 and pin 34 on the adapter unit and is yieldably urged by a spring 35 to a position blocking flow through the port 28. As is apparent, the check valve is arranged to open and permit flow from the delivery pipe 27 through the port 28 and chamber 25 to the supply line 11, and to close to prevent return flow. A drop pipe 36 is connected to the adapter unit to permit withdrawal of the adapter unit and pump and motor assembly from the tank. The power for the motor is supplied through conductors which extend through the adapter unit downwardly into the tank, A valve mechanism is also provided at the pedestal 12 and so arranged as to be closed when the pump is stopped to thereby entrap the liquid in the supply line 11 between the check valve 32 and the valve mechanism in the pedestal. As shown herein, the supply line 11 at each of the pedestals is connected to a delivery hose 41 having a conventional normally closed discharge valve 42 on the outlet end thereof, which discharge valve is manually operable to its open position to permit dispensing of gasoline therefrom. The pedestal 12 also includes a conventional nozzle support 43 and a switch lever 44 which extends over the nozzle support and is pivotally mounted by a bracket 45 on the pedestal. The switch lever is connected through a link 46 to the operating lever 47 of the pump control switch 48 and is also connected through a link 49 to the operating lever 51 of an interlock valve 52. The interlock valve is disposed in the supply line leading to the hose 41 and is normally closed, the interlock valve being opened in response to movement of the switch lever 44 to a position to close the pump control switch 48. A check valve 53 is also commonly provided in the supply line, either before or after the interlock valve, and a meter 55 controlling a register 56 is provided in the supply line for measuring the quantity of liquid passing therethrough.

When the discharge valve 42 is closed to stop the dispensing of liquid, the check valve 53 at the pedestal also closes. The pump continues to operate and delivers liquid to the line until the pressure in the line builds up to the maximum pressure, that is the full discharge pressure of the pump less any loss in head due to the difference in elevation between the pump and the supply line. The check valve 32 at the tank then closes to prevent return flow and maintain the pressure in the line. The discharge valve 42 on the hose is thereafter hung on the support 43 and operates the lever 44 to close the interlock valve and open the switch 48 to stop the pump. In accordance with the present invention, provision is made for detecting a leak in the supply line between the valve at the tank and the valve at the pedestals. Since the supply line is effectively isolated from the remainder of the system when the pump is stopped, and as the liquid in the line is substantially incompressible, even a very small change in volume in the line, due to thermal contraction or a leak in the line, will produce a marked change in pressure in the line. In the specific form herein illustrated, this leak detector includes an apparatus 61 which communicates through a conduit 60 with the supply line 11, between the tank valve and the pedestal valves and detects a change in the volume-pressure conditions in the line.

The specific detecting apparatus 61 herein illustrated includes a housing 62 having a dished bottom wall 63, a diaphragm 64 overlying the dished bottom wall and a dished cap member 65 which is secured by fasteners 66 to the bottom wall to define a chamber therewith separated by the diaphragm 64 into upper and lower compartments 63a and 65a. An armature 67 is attached to the diaphragm 64 for movement therewith and is movable between a position closing a first normally-open snap-acting switch 68 having an operator 68a, to a position closing a second normally-open snap-acting switch 69 having an operator 69a. A spring 71 is interposed between the armature 67 and the housing to yieldably urge the armature from a position closing switch 68 to a position closing switch 69. When the pump is operated, the pressure in the supply line varies from normal delivery pressure, that is the pressure the pump will maintain in the line when all the delivery valves 42 are open, to maximum delivery pressure when all the delivery valves are closed. In order to prevent spurious opening and closing of the switches during a normal delivery cycle, the spring 71 is selected to permit the diaphragm 64 and armature 67 to move upwardly and close switch 68 when the line pressure reaches a preselected value which is less than normal operating pressure. As the diaphragm 64 moves upwardly, the chamber 65a is filled. When the volume of liquid in the line decreases, due to thermal contraction of the liquid in the line, or due to leakage from the line, the pressure on the underside of the diaphragm will decrease and the spring will move the diaphragm downwardly. After a preselected volume of liquid has passed out of the chamber, the armature 67 closes switch 69. The detector 61 thus includes an expansible chamber 65a which receives a charge of liquid when the pump is operated and which delivers this charge to the supply line when the pump is stopped to maintain the supply line full of liquid. The diaphragm moves from a position closing switch 68 to a position closing switch 69 in response to a preselected decrease in pressure in the supply line, and the liquid displaced by the diaphragm as it moves between these positions is correlative with the decrease in the volume of liquid in the line which produced the aforementioned preselected decrease in pressure.

It has been experimentally determined that the rate of decrease in the volume and hence pressure in the supply line due to thermal contraction of the liquid with changes in ambient temperature will, under all operating conditions, be relatively low as compared to the rate of decrease in volume and pressure in the supply line due to any significant leak in the line. In accordance with the present invention, provision is made for measuring the rate of decrease in the volume-pressure condition in the supply line by measuring the rate at which the armature 67 moves from a position closing switch 68 to a position closing switch 69.

Figure 3:
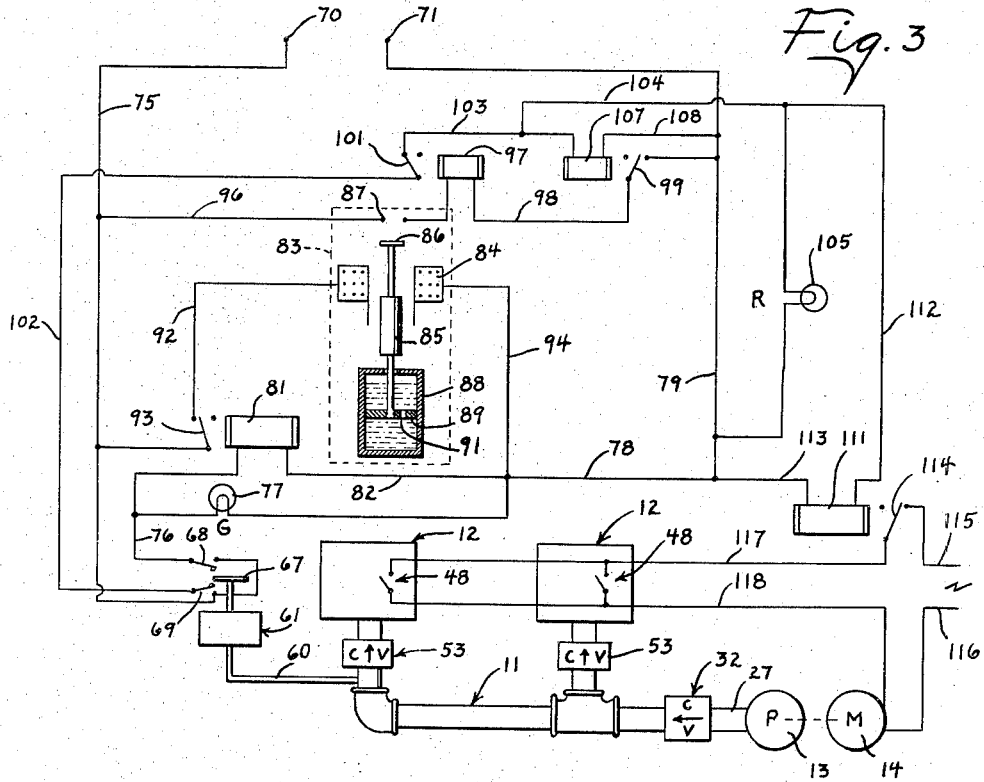
Fig. 3 is a schematic diagram of the leak detecting system of the present invention.
Figure 4:
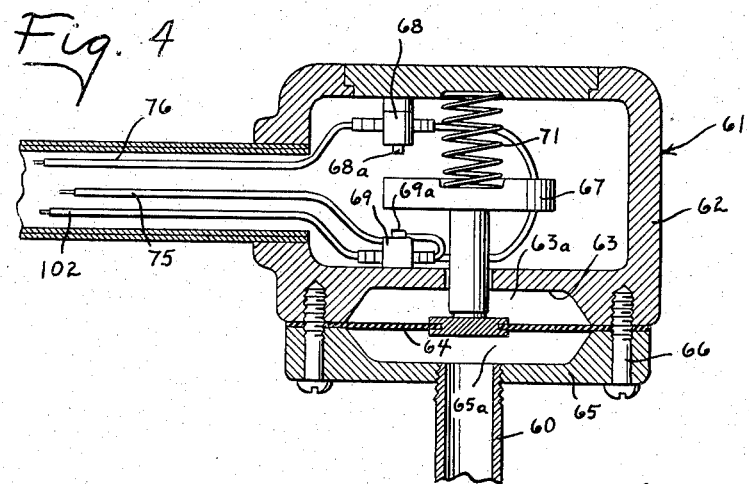
Fig. 4 is an enlarged sectional view through the apparatus in the fluid supply line for detecting the pressure conditions therein.

Reference is now made more specifically to Fig. 3 of the drawings. A power conductor 75 is connected from one of the power input terminals 70 to one contact of each of the normally-open switches 68 and 69. The upper switch 68 is also connected through conductor 76, indicating lamp 77, hereinafter referred to as the green lamp, and conductors 78 and 79 to the other power input terminal 71. A relay 81, the purpose of which will be described more fully hereinafter, is connected by conductor 82 in parallel with the indicating lamp 77. When the pump is operated, the pressure in the supply line acts on the diaphragm 64 and raises the armature 67 upwardly to close switch 68 and complete a circuit to the lamp 77 and relay 81 and actuate the same.

The relay 81 is arranged to control an interval timer 83, which timer is so arranged as to start measuring a time interval when the switch 68 opens. A "dash-pot" type timer is diagrammatically illustrated herein and includes a solenoid 84 adapted when energized to move an armature 85 in one direction. A switch member 86 is attached to the armature and is arranged to close contacts 87. A piston 89 having a flow control port 91 therein is attached to the armature 85 and disposed in a fluid reservoir 88 to form a "dash-pot" which controls the time interval measured by the timer by regulating the rate of movement of the armature 85 to its switch closing position. The solenoid 84 is connected through conductor 92 and normally closed relay operated switch 93 to the conductor 75 leading to the input terminal 70, and through conductors 94, 78 and 79 to the other input terminal 71. As is apparent, when the relay 81 is energized upon closing of the upper switch 68 by the armature 67, the solenoid 84 is de-energized to permit the timer armature 85 to move downwardly. When the pump is stopped and the pressure in the supply line begins to decrease, the armature 67 moves downwardly and permits switch 68 to open and de-energize the solenoid 81. The normally closed switch 93 controlled by relay 81 then recloses and energizes the solenoid 84 of the timer. The solenoid remains energized and the armature 85 of the timer moves upwardly at a rate determined by the dash-pot.

The timer controlled switch 87 is connected by conductor 96 to the power conductor 75 and is otherwise connected through a relay 97, conductor 98 and relay operated switch 99 to the other power conductor 79. A preselected time interval after the timer solenoid 84 is energized, the switch member 86 will close the timer contact 87 and energize the relay 97. As previously described, the armature 67 will move from a position closing switch 68 to a position closing switch 69 in a relatively short time interval after the pump is stopped, if there is a significant leak in the line. However, if there is no leak in the line, a relatively long time interval will elapse after the pump is stopped before thermal contraction in the line will reduce the volume and pressure therein sufficient to cause armature 67 to move from a position closing switch 68 to a position closing switch 69. The interval measured by the timer is selected to be greater than the aforementioned "short" time interval but less than the relatively "long" time interval. Necessarily, the interval measured by the timer must be correlated with the volume displaced by diaphragm 65a as it moves from a position closing switch 68 to a position closing switch 69. If the volume is small, the time during which this volume would pass through a significant leak in the line will be shorter than the time required for a larger volume to pass through a similar leak.

If the volume and pressure changes relatively slowly, due to thermal contraction in the supply line, the switch 86 will close and energize the relay 97 to thereby open the normally closed relay switch 101. This relay switch is connected through conductor 102 to the switch 69 and through conductors 103 and 104 to a second indicator light 105 hereinafter referred to as the red light, which light is otherwise connected to the power conductor 79. However, if there is a leak in the system, the detector armature 67 will close switch 69 before the timer 83 closes the contacts 87. Under these conditions, power will be supplied from conductor 75 through switch 69, conductor 102, relay switch 101 and conductors 103 and 104 to the red indicator lamp 105 to energize the same and indicate the presence of a leak in the system. In order to prevent subsequent energization of the relay 97 when the timer contacts 87 are closed, a relay 107 is connected by conductor 108 in parallel with the indicator lamp 105 and is arranged, when energized, to open the normally closed relay switch 99 in the ground circuit for relay 97 to prevent energization of the latter.

Although the indicator lamp 105 will indicate the presence of a leak in the system, the leak detecting system is also advantageously arranged to prevent delivery of gasoline through the supply line 11 when a leak has been detected so as to preclude the possibility that the service station operator will merely disregard the warning light and allow the leak to go uncorrected for a prolonged period. The may conveniently be achieved by the provision of a relay 111 which is connected by conductors 112 and 113 in parallel with the indicator lamp 105 so as to be energized when the rate of decrease of volume and pressure indicates a leak in the system. In the specific arrangement herein shown, the relay 111 controls a switch 114 which is connected in the motor energizing circuit. This circuit includes input conductors 115 and 116, switch 114, conductors 117 and 118 and pedestal switches 48 which are connected to conductors 117 and 118 in parallel with each other. The relay switch 114 is normally closed so that the pump motor is energized whenever one of the pedestal switches 48 is closed. However, when a leak is detected, the relay 111 opens the switch 114 so as to prevent operation of the pump motor when one of the pedestal switches is closed. This prevents the operator from dispensing gasoline and forces him to correct the leak.

From the foregoing it is thought that the operation of the system will be understood. Briefly, when it is desired to dispense gasoline, the delivery valve 42 on the hose 41 is removed from its hook and the lever 44 operated to close the pump switch 48 and open the interlock valve 52. The pump 13 will then deliver gasoline past the check valve 32 through the supply line 11 and past check valve 53, interlock valve 52 and discharge valve 42 when the latter is opened. When the pump is operating, the pressure in the supply line varies from maximum delivery pressure when the delivery valves are closed to normal delivery pressure when the delivery valves are open. Since the pressure in the supply line required to raise the armature 67 is less than normal delivery pressure, the armature 67 remains in its raised position during the dispensing cycle and maintains switch 68 closed. When the hose valve is thereafter hung on the hook 43, the switch lever 44 is operated to close the interlock valve 52 and to also open the switch 48 to stop the pump. The check valve 32 at the tank automatically closes to prevent return flow and entraps the liquid in the supply line at maximum delivery pressure between the check valve 32 and the pedestal valves.

When the switch 68 is closed, it establishes a circuit to relay 81 to energize the same and open the switch 93 to thereby de-energize the timer 83. The timer then resets itself to its normally open position. When the pressure in the supply line drops below normal operating pressure, the armature 67 moves out of engagement with operator for switch 68 to permit the same to open and de-energize relay 81. The switch 93 then closes and energizes the timer solenoid 84. If the pressure drop in the line is due only to thermal contraction of the liquid in the line, it will be relatively slow and under these conditions the timer 83 is arranged to close contacts 87 before the detector armature 67 closes switch 69. When the contacts 87 are closed, the relay 97 is energized so as to thereby open the switch 101 and prevent actuation of the indicator lamp 105 or the disconnect relay 111. However, if the pressure drop in the line is due to a leak, it will be relatively rapid and, under these conditions, the armature 67 will close switch 69 before the timer contacts 87 are closed so as to thereby establish a circuit to the indicator lamp 105 and relay 111 to interrupt the power supply for the pump motor and indicate the presence of a leak.

We claim:

1. A liquid pumping system including a supply source, a remote delivery outlet, a supply line extending from the source to the outlet, a pump at said source selectively operable to pump liquid therefrom into the supply line under pressure, a first valve means in said supply line adjacent said source, a second valve means in said supply line adjacent said outlet, said first and second valve means being operative to close when said pump means is stopped to trap the liquid in the supply line therebetween and maintain the same under pressure, and means operative when said pump is stopped for detecting a decrease in the volume of the liquid in the supply line between said first and second valve means, and means for interrupting subsequent delivery of liquid through the line when the detected decrease in volume is in excess of the decrease in volume which could be produced by thermal contraction due to changes in ambient temperature.

2. A liquid pumping system including a supply source, a remote delivery outlet, a supply line extending from the source to the outlet, a pump at said source selectively operable to pump liquid therefrom into the supply line under pressure, a first valve means in said supply line adjacent said source, a second valve means in said supply line adjacent said outlet, said first and second valve means being operative to close when said pump is stopped to trap the liquid in the supply line therebetween and maintain the same under pressure, an expansible and contractible chamber communicating with said supply line between said first and second valve means adapted to receive a charge of liquid when said pump is operated and to deliver the liquid back to the line when the pump is stopped and the volume of liquid in the line decreases, and means responsive to flow of liquid out of said chamber when said pump is idle for detecting a leak from said supply line.

3. A liquid pumping system including a supply source, a remote delivery outlet, a supply line extending from the source to the outlet, a pump at said source selectively operable to pump liquid therefrom into the supply line under pressure, a first valve means in said supply line adjacent said source, a second valve means in said supply line adjacent said outlet, said first and second valve means being operative to close when said pump means is stopped to trap the liquid in the supply line therebetween and maintain the same under pressure, an expansible and contractible chamber communicating with said supply line between said first and second valve means adapted to receive a charge of liquid when said pump is operated and to deliver the liquid back to the line when the pump is stopped and the volume of liquid in the line decreases, and means responsive to flow of liquid out of said chamber when said pump is idle for interrupting subsequent delivery of liquid to said outlet.

4. A liquid pumping system including a supply source, a remote delivery outlet, a supply line extending from the source to the outlet, a pump adjacent said source, selectively operable switch means for controlling operation of said pump, a first valve means in said supply line adjacent said source, a second valve means in said supply line adjacent said outlet, means for closing said first and second valve means when said switch means is opened to stop said pump whereby to trap the liquid in the supply line between said first and second valve means and maintain the same under pressure, and leak detecting means communicating with said supply line between said first and second valve means and responsive to a decrease in the volume of liquid in said line between said first and second valve means when said pump is stopped for interrupting subsequent delivery of liquid to said outlet when said switch means is thereafter closed to start the pump.

5. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a liquid receiving chamber communicating with said supply line between said first and second valve means adapted to receive a charge of liquid from the line when the pump is operated and to deliver the liquid back to the line when the pump is stopped and the volume of liquid in the line decreases, and means operative in response to a preselected rate of flow of liquid out of the chamber in excess of the rate of decrease in volume of the liquid in the line with changes in ambient temperature when said pump is idle for detecting a leak from said supply line.

6. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the gasoline in the supply line between said first and second valve means and maintain the line under pressure, a chamber communicating with said supply line between said first and second valve means adapted to receive a charge of liquid when said pump is operated, and means operative in response to a preselected rate of flow of liquid out of said chamber for interrupting delivery of gasoline to said pedestal when said switch is thereafter actuated to start the pump.

7. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a chamber communicating with said supply line adapted to receive a charge of liquid when said pump is operated, means operative when said pump is stopped for detecting the passage of a preselected volume of liquid out of said chamber, and means including a timer means for measuring a preselected time interval and for indicating a leak in the supply line if said preselected volume passes out of said chamber within said time interval.

8. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a chamber communicating with said supply line adapted to receive a charge of liquid when said pump is operated, timer means adapted upon actuation to measure a preselected time interval, means operative when said pump is stopped for detecting the passage of a preselected volume of liquid out of said chamber, means controlled by said detecting means for actuating said timer means when said preselected volume begins to pass out of said chamber, and means operative in response to the passage of said preselected volume out of said chamber within said measured time interval for indicating a leak in the supply line.

9. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a chamber communicating with said supply line adapted to receive a charge of liquid when said pump is operated, timer means adapted upon actuation to measure a preselected time interval, means operative when said pump is stopped for detecting the passage of a preselected volume of liquid out of said chamber, means controlled by said detecting means for actuating said timer means when said preselected volume begins to pass out of said chamber, a second switch means actuatable to prevent operation of said pump when said first-mentioned switch is closed, and means operative when said preselected volume passes out of said chamber within said measured time interval for actuating said second switch means.

10. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a chamber communicating with said supply line adapted to receive a charge of liquid when said pump is operated, a movable wall in said chamber, timer means adapted upon actuation to measure a preselected time interval, first and second switch means, means connected to said movable wall for actuating said first switch means when said wall is in one position in the chamber and for actuating said second switch means when said wall is in a second position in the chamber, means controlled by said first switch means for actuating said timer, and means responsive to actuation of said second switch means within said measured time interval for indicating a leak in said supply line.

11. A liquid pumping system including a storage tank, a remote pedestal having a delivery outlet, a supply line extending from the tank to the outlet, a pump at said tank, means including a selectively actuatable switch for controlling operation of said pump, a first valve means in said supply line adjacent said tank, a second valve means in said supply line adjacent said pedestal, means for closing said first and second valve means when said pump is stopped to thereby trap the liquid in the supply line between said first and second valve means and maintain the line under pressure, a chamber communicating with said supply line adapted to receive a charge of liquid when said pump is operated, a movable wall in said chamber, timer means adapted upon actuation to measure a preselected time interval, first and second switch means, means connected to said movable wall for actuating said first switch means when said wall is in one position in the chamber and for actuating said second switch means when said wall is in a second position in the chamber, a first circuit means controlled by said first switch means for actuating said timer, a second circuit means controlled by said second switch means for indicating a leak in said supply line, a third circuit means controlled by said timer, a first relay in said third circuit means for disabling said second circuit means if said timer completes its timing cycle before said second switch means is actuated, and a second relay in said second circuit means for disabling said third circuit means if said second switch means is actuated before said timer completes its timing cycle.

12. The combination of claim 11 wherein said second circuit means includes means for preventing subsequent operation of said pump means.

References Cited in the file of this patent
UNITED STATES PATENTS

| | | |
|---|---|---|
| 2,472,973 | Hoffman et al. | June 14, 1949 |
| 2,573,053 | Pearlman | Oct. 30, 1951 |
| 2,641,277 | Booth | June 9, 1953 |
| 2,769,395 | Olson | Nov. 6, 1956 |
| 2,853,874 | Mennesson | Sept. 30, 1958 |